(12) United States Patent
Mizusawa

(10) Patent No.: US 8,331,039 B2
(45) Date of Patent: Dec. 11, 2012

(54) OPTICAL SYSTEM

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 102 days.

(21) Appl. No.: 12/924,543

(22) Filed: Sep. 28, 2010

(65) Prior Publication Data

US 2011/0075273 A1  Mar. 31, 2011

(30) Foreign Application Priority Data

Sep. 30, 2009 (JP) ................................ 2009-228455

(51) Int. Cl.
  *G02B 17/00* (2006.01)
  *G02B 15/14* (2006.01)
(52) U.S. Cl. ......................... 359/736; 359/726; 359/684
(58) Field of Classification Search ................. 359/726, 359/734–736, 678, 684, 656, 660
  See application file for complete search history.

(56) References Cited

U.S. PATENT DOCUMENTS

| | | |
|---|---|---|
| 2004/0212877 A1 | 10/2004 | Borchard |
| 2004/0254424 A1 | 12/2004 | Simkulet et al. |
| 2010/0091385 A1* | 4/2010 | Togino .......................... 359/736 |

FOREIGN PATENT DOCUMENTS

| | | |
|---|---|---|
| EP | 1 769 718 | 4/2007 |
| JP | 2007-233036 | 9/2007 |
| JP | 2008-309859 | 12/2008 |
| WO | WO 03/042743 | 5/2003 |
| WO | WO 2005/110186 | 11/2005 |
| WO | 2006/129977 | 12/2006 |

OTHER PUBLICATIONS

European Extended Search Report, issued in corresponding European Patent Application No. 10011753.0.

* cited by examiner

*Primary Examiner* — Alicia M Harrington
(74) *Attorney, Agent, or Firm* — Kenyon & Kenyon LLP

(57) ABSTRACT

An optical system for observing front and lateral objects includes a negative front group having a reflective refractive element, an aperture stop, and a positive rear group having a moving lens unit that is movable along the optical axis. The reflective refractive element includes a front-object-side first face having a transmitting surface and a reflective surface annularly formed around the transmitting surface, an image-side second face having a transmitting surface and a reflective surface annularly formed around the transmitting surface, and a face formed as a transmitting surface between the first and second faces. The optical system performs focusing onto an object while hardly changing, in the entire observation area, an area in which an image of the front object is formed, by moving the moving lens unit to the extent that the refractive powers of the front and rear groups hardly change relative to each other.

6 Claims, 22 Drawing Sheets

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM   – – – – – – 486.1000 NM
------------------- 587.5600 NM   — - - — - - 435.8300 NM
— - — - — - — 546.0700 NM

COMA ON SAGITTAL PLANE

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

―――――― 656.2700 NM   ---------- 486.1000 NM
---------- 587.5600 NM   —·—·—·— 435.8300 NM
—·—·—·— 546.0700 NM

COMA ON MERIDIONAL PLANE

HALF FIELD ANGLE (115.0)°

COMA ON MERIDIONAL PLANE

HALF FIELD ANGLE (105.0)°

COMA ON MERIDIONAL PLANE

HALF FIELD ANGLE (95.00)°

COMA ON MERIDIONAL PLANE

HALF FIELD ANGLE (85.00)°

COMA ON MERIDIONAL PLANE

HALF FIELD ANGLE (75.00)°

——————— 656.2700 NM           ——————— 486.1000 NM
······· 587.5600 NM            —··—··— 435.8300 NM
—·—·— 546.0700 NM

COMA ON SAGITTAL PLANE

HALF FIELD ANGLE (115.0)°

COMA ON SAGITTAL PLANE

HALF FIELD ANGLE (105.0)°

COMA ON SAGITTAL PLANE

HALF FIELD ANGLE (95.00)°

COMA ON SAGITTAL PLANE

HALF FIELD ANGLE (85.00)°

COMA ON SAGITTAL PLANE

HALF FIELD ANGLE (75.00)°

——————— 656.2700 NM  ----------- 486.1000 NM
----------------- 587.5600 NM  —··—··— 435.8300 NM
—·—·—·— 546.0700 NM

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM     − − − − − −   486.1000 NM
- - - - - - - 587.5600 NM     —··—··—   435.8300 NM
—··—··— 546.0700 NM

COMA ON SAGITTAL PLANE

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

——————— 656.2700 NM       ---------- 486.1000 NM
----------------- 587.5600 NM       — - - — - - — 435.8300 NM
— - - — - - — 546.0700 NM

COMA ON MERIDIONAL PLANE

HALF FIELD ANGLE (115.0)°

COMA ON MERIDIONAL PLANE

HALF FIELD ANGLE (105.0)°

COMA ON MERIDIONAL PLANE

HALF FIELD ANGLE (95.00)°

COMA ON MERIDIONAL PLANE

HALF FIELD ANGLE (85.00)°

COMA ON MERIDIONAL PLANE

HALF FIELD ANGLE (75.00)°

——————— 656.2700 NM
- - - - - - - 587.5600 NM
— - — - — 546.0700 NM
— — — — — 486.1000 NM
— - - — - - — 435.8300 NM

COMA ON SAGITTAL PLANE

HALF FIELD ANGLE (115.0)°

COMA ON SAGITTAL PLANE

HALF FIELD ANGLE (105.0)°

COMA ON SAGITTAL PLANE

HALF FIELD ANGLE (95.00)°

COMA ON SAGITTAL PLANE

HALF FIELD ANGLE (85.00)°

COMA ON SAGITTAL PLANE

HALF FIELD ANGLE (75.00)°

——————— 656.2700 NM      ————— 486.1000 NM
------------------ 587.5600 NM      —————— 435.8300 NM
—·—·—·— 546.0700 NM

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM   ————— 486.1000 NM
----------------- 587.5600 NM   —— —— —— 435.8300 NM
— - — - — 546.0700 NM

COMA ON SAGITTAL PLANE

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

———————— 656.2700 NM          ---------- 486.1000 NM
------------------ 587.5600 NM          —— - —— - —— 435.8300 NM
—— - —— - —— 546.0700 NM

COMA ON
MERIDIONAL PLANE

HALF FIELD ANGLE
(115.0)°

COMA ON
MERIDIONAL PLANE

HALF FIELD ANGLE
(105.0)°

COMA ON
MERIDIONAL PLANE

HALF FIELD ANGLE
(95.00)°

COMA ON
MERIDIONAL PLANE

HALF FIELD ANGLE
(85.00)°

COMA ON
MERIDIONAL PLANE

HALF FIELD ANGLE
(75.00)°

——————— 656.2700 NM     ————————— 486.1000 NM
----------------- 587.5600 NM     ——·——·— 435.8300 NM
—·—·—·—·— 546.0700 NM

COMA ON SAGITTAL PLANE

HALF FIELD ANGLE (115.0)°

COMA ON SAGITTAL PLANE

HALF FIELD ANGLE (105.0)°

COMA ON SAGITTAL PLANE

HALF FIELD ANGLE (95.00)°

COMA ON SAGITTAL PLANE

HALF FIELD ANGLE (85.00)°

COMA ON SAGITTAL PLANE

HALF FIELD ANGLE (75.00)°

——————— 656.2700 NM   － － － － － 486.1000 NM
- - - - - - - 587.5600 NM   — - - — - - — 435.8300 NM
— - - — - - — 546.0700 NM

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM       – – – – – – – 486.1000 NM
- - - - - - - - - 587.5600 NM       — - - — - - — 435.8300 NM
— - — - — 546.0700 NM

COMA ON SAGITTAL PLANE

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

——————— 656.2700 NM     ---------- 486.1000 NM
------------------ 587.5600 NM    —·—·—·— 435.8300 NM
—··—··— 546.0700 NM

COMA ON
MERIDIONAL PLANE

HALF FIELD ANGLE
(115.0)°

COMA ON
MERIDIONAL PLANE

HALF FIELD ANGLE
(105.0)°

COMA ON
MERIDIONAL PLANE

HALF FIELD ANGLE
(95.00)°

COMA ON
MERIDIONAL PLANE

HALF FIELD ANGLE
(85.00)°

COMA ON
MERIDIONAL PLANE

HALF FIELD ANGLE
(75.00)°

——————— 656.2700 NM         — — — — — 486.1000 NM
----------------- 587.5600 NM         — ·· — ·· — 435.8300 NM
— · — · — 546.0700 NM

COMA ON SAGITTAL PLANE

HALF FIELD ANGLE (115.0)°

COMA ON SAGITTAL PLANE

HALF FIELD ANGLE (105.0)°

COMA ON SAGITTAL PLANE

HALF FIELD ANGLE (95.00)°

COMA ON SAGITTAL PLANE

HALF FIELD ANGLE (85.00)°

COMA ON SAGITTAL PLANE

HALF FIELD ANGLE (75.00)°

———————— 656.2700 NM     ------------ 486.1000 NM
---------------- 587.5600 NM     —--—--—— 435.8300 NM
—-—-—-—— 546.0700 NM

OPTICAL SYSTEM

This application claims benefits of Japanese Patent Application No. 2009-228455 filed in Japan on Sep. 30, 2009, the contents of which are hereby incorporated by reference.

BACKGROUND OF THE INVENTION

1. Field of the Invention

This invention relates to an optical system by which a front object and an approximately lateral object can be simultaneously observed.

2. Description of the Related Art

Optical systems by which a front object and an approximately lateral object can be simultaneously observed have been known up to now. Such optical systems include an optical system which is formed in such a way that, after light from the approximately-lateral-object side is reflected two times on the inside, the light emerges to the image side, and the optical system have been publicly known (for example, refer to Japanese Patent Kokai No. 2008-309895). Besides, in this case, the range which the above term, "approximately lateral", defines includes not only the lateral side of the optical system itself but also the diagonally front and diagonally backward sides of the optical system.

SUMMARY OF THE INVENTION

An optical system according to the present invention is characterized in that: in the optical system for observing a front object and an approximately lateral object, a front group having a reflective refractive optical element and negative refractive power, an aperture stop, and a rear group having a moving lens group and positive refractive power are arranged in order from the front-object side, where the moving lens group moves in the direction along the optical axis; the reflective refractive optical element includes a first surface, a second surface, and a third surface, where the first surface has a first transmitting surface and a first reflective surface and is formed on the front-object side, the first transmitting surface is formed with the center of the first transmitting surface on the optical axis, the first reflective surface is formed in the shape of a ring and around the first transmitting surface and faces toward the image side, the second surface has a second transmitting surface and a second reflective surface and is formed on the image side, the second transmitting surface is formed with the center of the second transmitting surface on the optical axis, the second reflective surface is formed in the shape of a ring and around the second transmitting surface and faces toward the front-object side, and the third surface is formed as a transmitting surface between the first and second surfaces; and the optical system makes focus on an object while an area in the observation area in which the image of the front object is formed hardly changes, by moving the moving lens group to the extent that the refractive powers of the front and rear groups hardly change relatively.

Also, in an optical system according to the present invention, it is preferred that the moving lens group has positive refractive power.

Also, in an optical system according to the present invention, it is preferred that the lens group nearest to the object side in the rear group differs from the moving lens group.

Also, in an optical system according to the present invention, it is preferred that: the front group includes a first lens group having negative refractive power and a second lens group; the rear group includes a third lens group having positive refractive power; a first optical system for observing a front object is formed by the first lens group, the second lens group, the aperture stop, and the third lens group; and a second optical system for observing an approximately lateral object is formed by the second lens group, the aperture stop, and the third lens group.

Also, in an optical system according to the present invention, it is preferred that: after light from the front-object side is incident on the first transmitting surface, the light emerges from the second transmitting surface to the image side; and after light from the approximately-lateral-object side is incident on the third surface, the light is reflected by the second reflective surface and the first reflective surface in that order and emerges from the second transmitting surface to the image side.

Also, it is preferred that an optical system according to the present invention satisfies the following condition:

$$1.4 < f_m/((f_{r\_c} + f_{r\_w})/2) < 2.3$$

where $f_m$ is the focal length of the moving lens group, $f_{r\_w}$ is the focal length of the rear group in far observations of front and approximately lateral objects, and $f_{r\_c}$ is the focal length of the rear group in close observations of front and approximately lateral objects.

The present invention can offer an optical system by which it is possible to carry out far observations of front and approximately lateral objects and to carry out close is observations of front and approximately lateral objects.

These and other features and advantages of the present invention will become apparent from the following detailed description of the preferred embodiments when taken in conjunction with the accompanying drawings.

BRIEF DESCRIPTION OF THE DRAWINGS

FIGS. 5A to 5E show coma in a meridional plane in the cases of half angles of view of 60°, 45°, 30°, 15°, and 0°, respectively, and FIGS. 5F to 5J show coma in a sagittal plane in the cases of half angles of view of 60°, 45°, 30°, 15°, and 0°, respectively.

FIGS. 6A to 6E show coma in a meridional plane in the cases of half angles of view of 115°, 105°, 95°, 85°, and 75°, respectively, and FIGS. 6F to 6J show coma in a sagittal plane in the cases of half angles of view of 115°, 105°, 95°, 85°, and 75°, respectively.

FIGS. 7A to 7E show coma in a meridional plane in the cases of half angles of view of 60°, 45°, 30°, 15°, and 0°, respectively, and FIGS. 7F to 7J show coma in a sagittal plane in the cases of half angles of view of 60°, 45°, 30°, 15°, and 0°, respectively.

FIGS. 8A to 8E show coma in a meridional plane in the cases of half angles of view of 115°, 105°, 95°, 85°, and 75°, respectively, and FIGS. 8F to 8J show coma in a sagittal plane in the cases of half angles of view of 115°, 105°, 95°, 85°, and 75°, respectively.

FIGS. 11A to 11E show coma in a meridional plane in the cases of half angles of view of 60°, 45°, 30°, 15°, and 0°, respectively, and FIGS. 11F to 11J show coma in a sagittal plane in the cases of half angles of view of 60°, 45°, 30°, 15°, and 0°, respectively.

FIGS. 12A to 12E show coma in a meridional plane in the cases of half angles of view of 115°, 105°, 95°, 85°, and 75°, respectively, and FIGS. 12F to 12J show coma in a sagittal plane in the cases of half angles of view of 115°, 105°, 95°, 85°, and 75°, respectively.

FIGS. 13A to 13E show coma in a meridional plane in the cases of half angles of view of 60°, 45°, 30°, 15°, and 0°, respectively, and FIGS. 13F to 13J show coma in a sagittal plane in the cases of half angles of view of 60°, 45°, 30°, 15°, and 0°, respectively.

FIGS. 14A to 14E show coma in a meridional plane in the cases of half angles of view of 115°, 105°, 95°, 85°, and 75°, respectively, and FIGS. 14F to 14J show coma in a sagittal plane in the cases of half angles of view of 115°, 105°, 95°, 85°, and 75°, respectively.

DETAILED DESCRIPTION OF THE PREFERRED EMBODIMENTS

Figure 1:
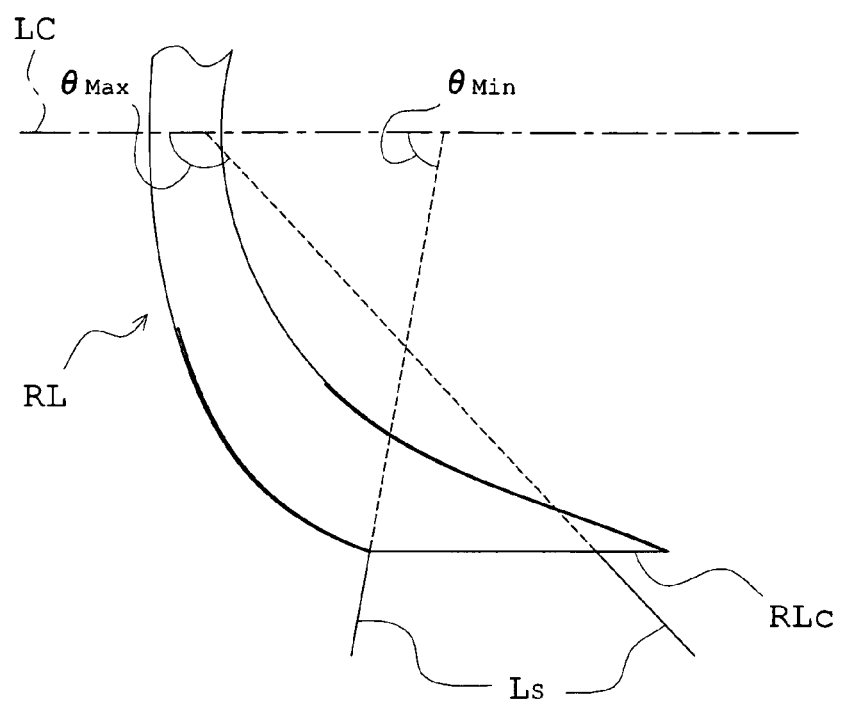
FIG. 1 is a schematic view showing angles of view of light incident on the reflective refractive optical element from the approximately-lateral-object side.

Before undertaking the description of the embodiments of an optical system of the present invention, the operation and effects by the formations of the present embodiments will be explained.

Optical systems according to the present embodiments are provided with a reflective refractive optical element, where the reflective refractive optical element includes: a first surface which has a first transmitting surface formed with the center of the first transmitting surface on the optical axis, has a first reflective surface formed in the shape of a ring and around the first transmitting surface and facing toward the image side, and is formed on the front-object side; a second surface which has a second transmitting surface formed with the center of the second transmitting surface on the optical axis, has a second reflective surface formed in the shape of a ring and around the second transmitting surface and facing toward the front-object side, and is formed on the image side; and a third surface formed as a transmitting surface between the first and second surfaces.

Since the optical systems of the present embodiments are provided with the reflective refractive optical element as described above, the optical system makes it possible to carry out an observation of a front object simultaneously with an observation of an approximately lateral object. Accordingly, when the optical system of the present invention is used for an endoscope, the optical system makes it easy to observe an area which is generally hard to observe by an endoscope, such as a complicatedly bending lumen and a region behind a fold. Besides, the above term, "reflective refractive optical element", means an element in which reflective and refractive actions of light are used.

Also, the optical systems of the present embodiments are characterized in that: in an optical system for observing a front object and an approximately lateral object, a front group having the reflective refractive optical element and negative refractive power, an aperture stop, and a rear group having a moving lens group and positive refractive power are arranged in order from the front-object side, where the moving lens group moves in the direction along the optical axis; and the optical systems are formed in such a way that the optical systems make focus on an object while an area in the observation area in which the image of the front object is formed hardly changes, by moving the moving lens group to the extent that the refractive powers of the front and rear groups hardly change relatively.

Accordingly, the optical systems of the present embodiments are formed so as to be an optical system of a retrofocus type with respect to light entering from an object side.

In a so-called retrofocus-type optical system, if negative refractive power of the front group and positive refractive power of the rear group do not change, an observation angle of view does not change too much in general even though the distance between an object surface and the imaging plane is changed. Accordingly, in the optical systems of the present embodiments which are formed as a retrofocus-type optical system with respect to light entering from an object side, the moving lens group which is provided for the rear group is moved along the optical axis to the extent that the refractive powers of the front and rear groups are hardly changed relatively, so that it is possible to make focus on an object while an area in the observation area in which the image of a front object is formed is hardly expanded or contracted. As a result, the optical systems of the present embodiments are formed in such a way that it is possible to carry out far observations of a front object and an approximately lateral object and close observations of a front object and an approximately lateral object. In this case, the above term, "close observation", means an observation of an object closest to the optical system within the range in which an object is in focus. In addition, "far observation", means an observation of an object farthest to the optical system within the range in which an object is in focus.

That is to say, in the optical systems of the present embodiments, it is possible to carry out a close observation by one optical system capable of making simultaneous observations of objects on the front and approximately-lateral sides. Accordingly, the present invention makes it possible to downsize an optical system, as compared with the case of using two optical systems for observing a front object and for observing an approximately lateral object, where the two optical systems can make close observation. Accordingly, the optical systems of the present embodiments can be preferably used for an endoscope apparatus or the like. Also, the optical systems of the present embodiments can make close observation, so that the optical systems also make it possible to estimate the grade of malignancy, invasion, or the like of a legion after the legion is found out, in the case where the optical systems of the present invention are used for an endoscope apparatus.

Also, in the optical systems of the present embodiments, it is preferred that the moving lens group has positive refractive power. If the moving lens group which is included in the third lens group is formed in such a way that the moving lens group has negative refractive power, the third lens group must at least include a lens group having positive refractive power besides the moving lens group in order that the third lens group is a lens group having positive refractive power, so that the formation of the moving lens group having negative refractive power causes an increase in the number of the lenses of the third lens group.

Also, in the optical systems of the present embodiments, it is preferred that the lens group nearest to the object side in the rear group differs from the moving lens group. Such formation of the moving lens group not used as the lens group nearest to the object side in the rear group makes it hard to affect the refractive powers of the front and rear groups.

Also, it is preferred that the optical systems of the present embodiments satisfy the following condition:

$$1.4 < f_m/((f_{r\_c}+f_{r\_w})/2) < 2.3$$

where $f_m$ is the focal length of the moving lens group, $f_{r\_w}$ is the focal length of the rear group in far observations of front and approximately lateral objects, and $f_{r\_c}$ is the focal length of the rear group in a close observation of front and approximately lateral objects.

In order that the movement of the moving lens group does not affect refractive power, in particular, the refractive power of the third lens group excessively, it is preferred that the focal length of the moving lens group is sufficiently larger than that of the third lens group. Accordingly, in the optical systems of the present embodiments, it is preferred that the optical systems is formed in such a way that the condition, "$1.4 < f_m/((f_{r\_c}+f_{r\_w})/2) < 2.3$", is satisfied.

If "$f_m/((f_{r\_c}+f_{r\_w})/2)$" is below the lower limit value of the condition, "$1.4 < f_m/((f_{r\_c}+f_{r\_w})/2) < 2.3$", the focal length of the moving lens group is too small for the focal length of the third lens group, and the movement of the moving lens group causes a large change in the focal length of the third lens group. That is to say, the observation area changes widely. On the other hand, if "$f_m/((f_{r\_c}+f_{r\_w})/2)$" is beyond the upper limit value of the condition, "$1.4 < f_m/((f_{r\_c}+f_{r\_w})/2) < 2.3$", the focal length of the moving lens group is too large for the focal length of the third lens group, and focus does not change too much (or, in-focus position is obscure). That is to say, the in-focus function of the optical system deteriorates.

The optical systems according to the embodiments 1 and 2 will be explained below referring to the drawings.

Besides, subscript numerals in $r_1, r_2, \ldots$ and $d_1, d_2, \ldots$ in sectional views of the optical system correspond to surface numbers, 1, 2, ... in numerical data, respectively.

Also, in the numerical data in each of the following embodiments, s denotes a surface number, r denotes the radius of curvature of each surface, d denotes a surface interval, nd denotes the refractive index at d line (which has a wave length of 587.56 nm), vd denotes the Abbe's number to the d line, K denotes a conical coefficient, and $A_4, A_6, A_8$, and $A_{10}$ denote aspherical surface coefficients, respectively.

Also, in the data for the aspherical surface coefficients in the numerical data, E denotes a power of ten. For example, "E-01" denotes "ten to the power of minus one". In addition, the shape of each aspherical surface is expressed by the following equation with aspherical surface coefficients which are described in the numerical data for each embodiment:

$$Z=(Y^2/r)/[1+\{1-(1+K)(Y/r)^2\}^{1/2}]+A_4Y^4+A_6Y^6+A_8Y^8+A_{10}Y^{10}+\ldots$$

where, Z is taken as a coordinate in the direction along the optical axis, and Y is taken as a coordinate in the direction perpendicular to the optical axis.

In the aberration diagrams, the meridional plane means a plane (plane parallel to this document plane) including the optical axis and the chief ray of an optical system. The sagittal plane means a plane (plane perpendicular to this document plane) which includes the optical axis and is perpendicular to the meridional plane. In the optical systems of the present embodiments, the optical systems are symmetric with respect to the meridional plane. Accordingly, negative values are omitted in the horizontal axis in the case of amount of aberration on the sagittal plane. In each of diagrams showing coma, the vertical axis corresponds to amount of aberration (unit: mm), and the horizontal axis corresponds to aperture ratio (−1 to 1). The wavelength corresponding to each of the traces is shown on the right-side corner of each of Figs.

Also, a matter which is explained below using FIG. 1 is the definition of angle of view of light entering from the approximately-lateral-object side in the reflective refractive optical element for the optical system of each of the present embodiments. FIG. 1 is a schematic view showing angles of view of light rays incident on the reflective refractive optical element for each of the present embodiments from the approximately-lateral-object side.

The angle between a principal ray $L_s$ and the optical axis LC, which is formed on the front-object side, becomes a half angle of view for the approximately-lateral-object side of the reflective refractive optical element RL, where the principal ray $L_s$ is the principal ray of light incident on the third surface RLc of the reflective refractive optical element RL from the approximately-lateral-object side.

Also, in the case of such reflective refractive optical element RL, it is impossible to observe a front object, or an object existing on the optical axis LC, through the third surface RLc. As a result, the angles of view have the minimum angle of view, $\theta_{Min}$ and the maximum angle of view, $\theta_{Max}$. In this case, the minimum angle of view, $\theta_{Min}$ means the angle $\theta_{Min}$ between the optical axis and the principal ray of light nearest to the front-object side in the range which can be observed through the third surface RLc. On the other hand, the maximum angle of view, $\theta_{Max}$ means the angle $\theta_{Max}$ between the optical axis and the principal ray of light nearest to the image side in the range which can be observed through the third surface RLc, Embodiment 1

The optical system according to the embodiment 1 is explained below in detail using FIGS. 2 to 8.

Figure 2A:
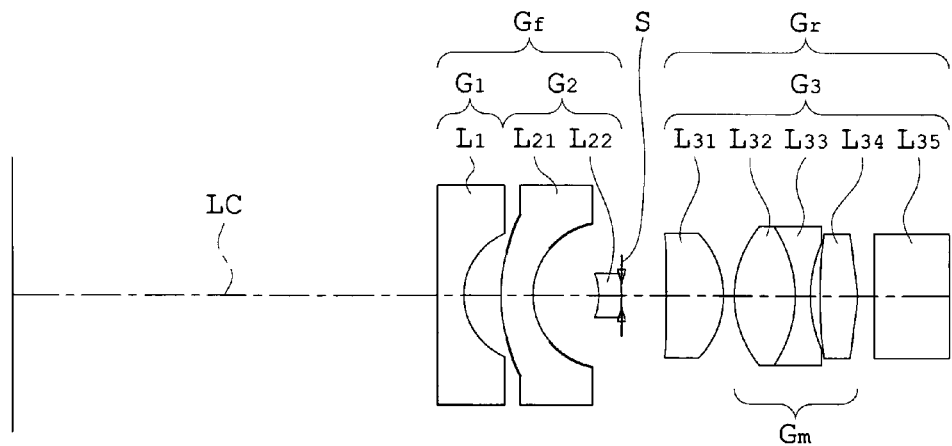
FIGS. 2A and 2B are sectional views showing the formation of an optical system according to the embodiment 1, taken along the optical axis, in the cases of far observations of objects on the front and approximately-lateral sides and a close observation of an object on the front side, respectively.
Figure 2B:
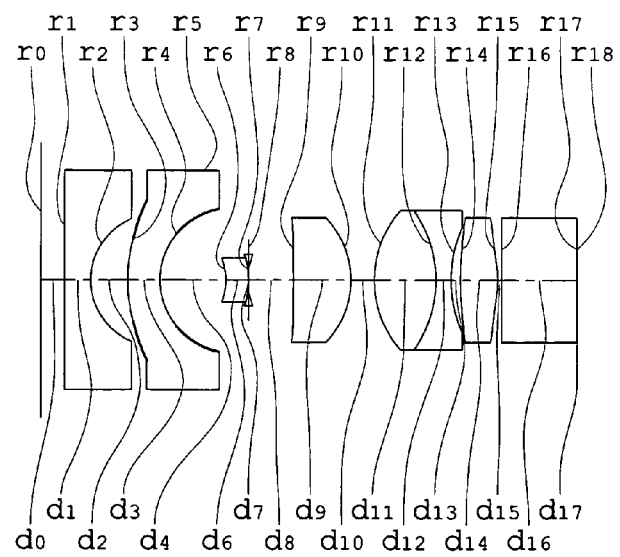
Figure 3A:
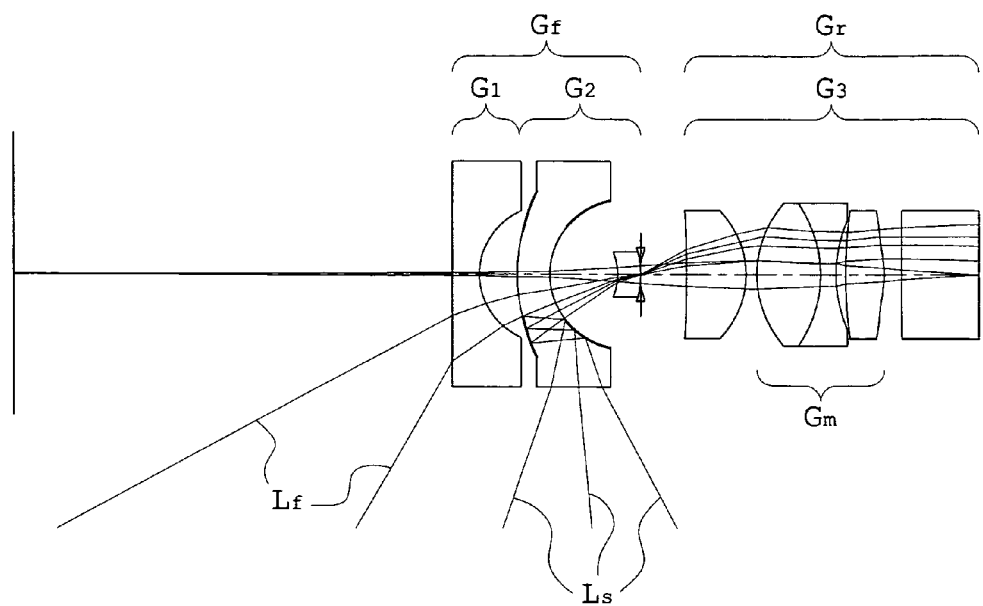
FIGS. 3A and 3B are sectional views showing the formation of an optical system according to the embodiment 1 and optical paths, taken along the optical axis, in the cases of far observations of objects on the front and approximately-lateral sides and a close observation of an object on the front side, respectively.
Figure 3B:
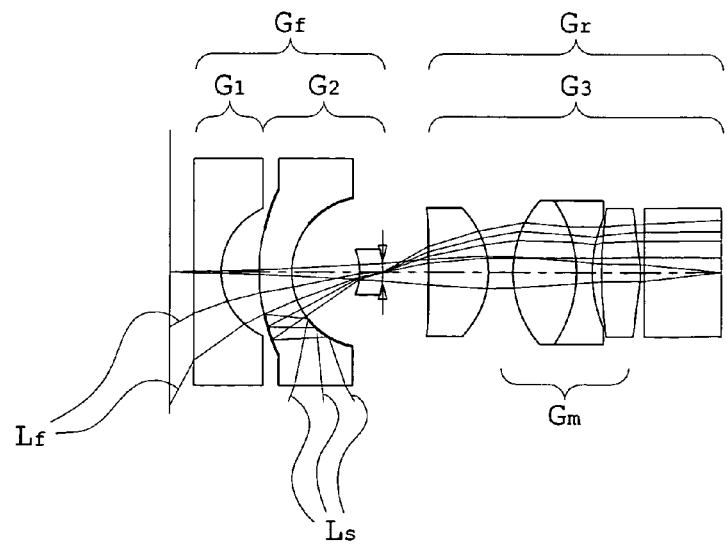

First, the formation of the optical system of the present embodiment is explained using FIGS. 2 and 3.

In the optical system of the present embodiment, a front group $G_f$ having negative refractive power as a whole, an aperture stop S, a rear group $G_r$ having positive refractive power as a whole are arranged on the optical axis LC of light from the front-object side and in order from the front-object side. The front group $G_f$ includes a first lens group $G_1$ and a second lens group $G_2$, in order from the front-object side. The rear group $G_r$ includes a third lens group $G_3$.

The first lens group $G_1$ is composed of a lens $L_1$ which is a plano-concave lens the concave surface of which faces toward the image side.

The second lens group $G_2$ is composed of a lens $L_{21}$ and a lens $L_{22}$ in order from the front-object side, where the lens $L_{21}$ is a reflective refractive optical element the front-object-side surface of which is an aspherical surface, and the lens $L_{22}$ is a negative meniscus lens the convex surface of which faces toward the image side.

The aperture stop S is arranged on the image-side surface of the lens $L_{22}$.

The third lens group $G_3$ is composed of a lens $L_{31}$, a lens $L_{32}$, a lens $L_{33}$, a lens $L_{34}$, and a lens $L_{35}$ in order from the front-object side, where the lens $L_{31}$ is a positive meniscus lens the object-side surface of which is an aspherical surface and the convex surface of which faces toward the image side, the lens $L_{32}$ is a biconvex lens, the lens $L_{33}$ is a biconcave lens, the lens $L_{34}$ is a biconvex lens the image-side surface of which is an aspherical surface, the lens $L_{35}$ is a planer lens. Besides, the image-side surface of the lens $L_{32}$ and the object-side surface of the lens $L_{33}$ are cemented together. In addition, the lens $L_{32}$, the lens $L_{33}$ and the lens $L_{34}$ form a moving lens group $G_m$ and can integratedly move on the optical axis.

Besides, the shapes of these lenses correspond to a shape in the vicinity of the optical axis of light from the front-object side.

The optical system of the present embodiment is formed in such a way that the optical system focuses on an front object and an approximately lateral object which are close to the optical system, by integratedly moving the lens $L_{32}$, the lens $L_{33}$, and the lens $L_{34}$, which form the moving lens group, on the optical axis to the extent that the movement of the moving lens group does not affect the refractive powers of the front and rear groups $G_f$ and $G_r$ excessively.

Figure 4:
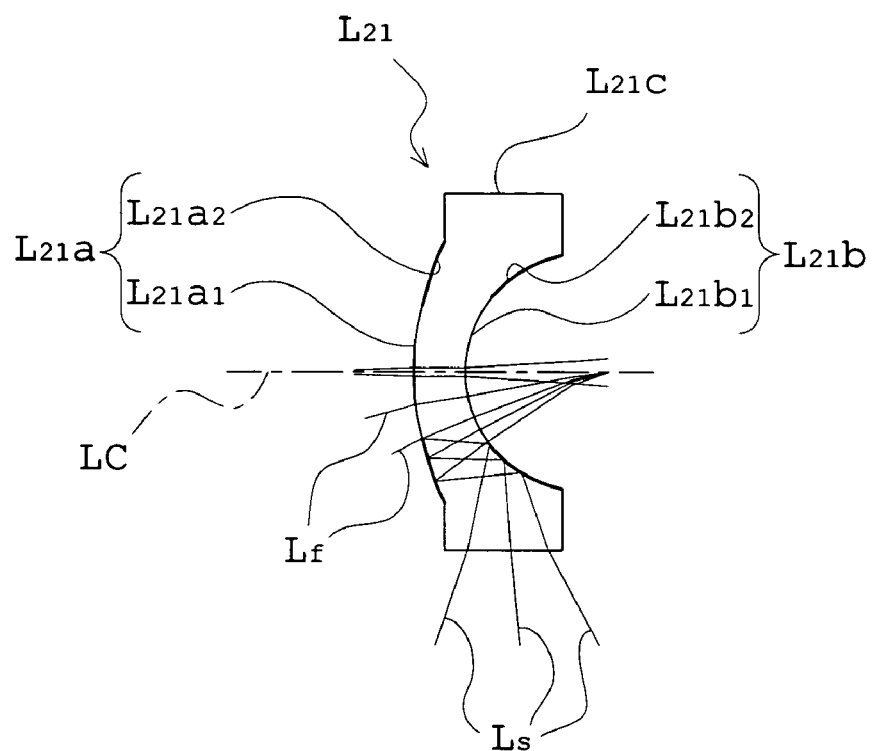
FIG. 4 is an enlarged view showing the reflective refractive optical element provided for the optical system according to the embodiment 1.
Figure 5A:
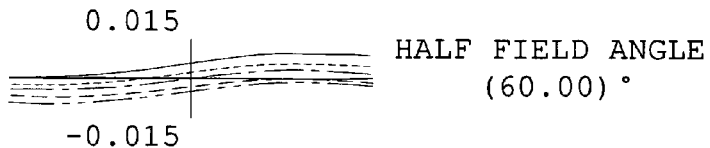
FIGS. 5A to 5E and FIGS. 5F to 5J are aberration curve diagrams of the optical system according to the embodiment 1 in the case where light rays traveling from the front-object side to the imaging plane are traced in far observations of objects on the front and approximately-lateral sides.
Figure 5B:
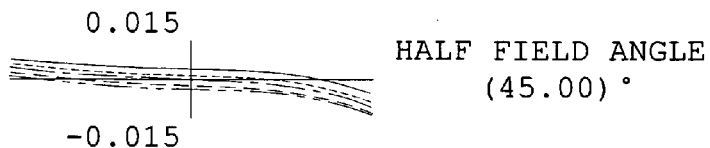
Figure 5C:
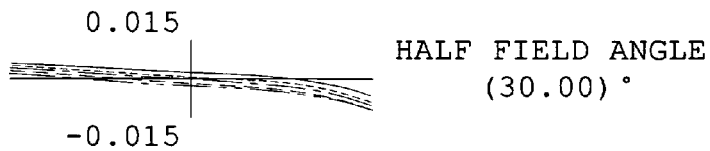
Figure 5D:
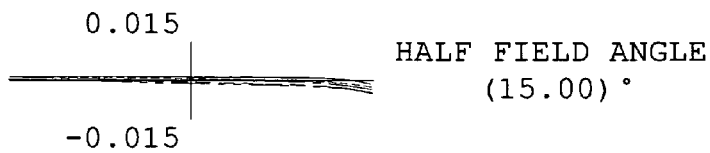
Figure 5E:
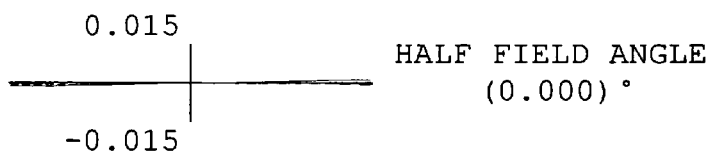
Figure 5F:
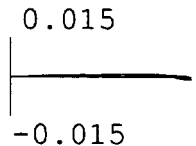
Figure 5G:
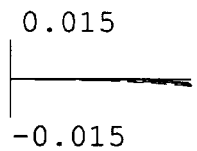
Figure 5H:
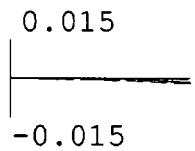
Figure 5I:
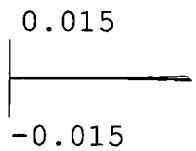
Figure 5J:
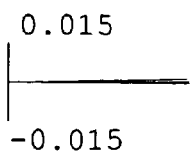
Figure 6A:
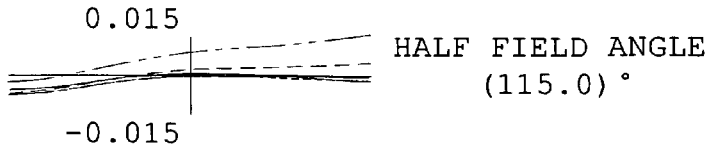
FIGS. 6A to 6E and FIGS. 6F to 6J are aberration curve diagrams of the optical system according to the embodiment 1 in the case where light rays traveling from the approximately-lateral-object side to the imaging plane are traced in far observations objects on the front and approximately-lateral sides.
Figure 6B:
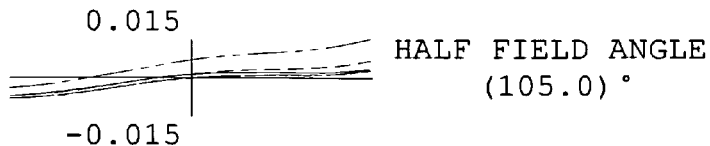
Figure 6C:
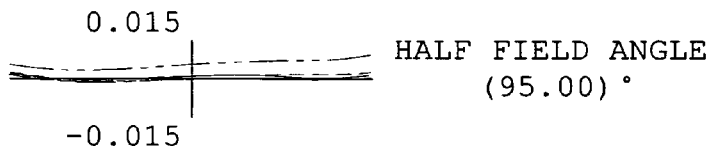
Figure 6D:
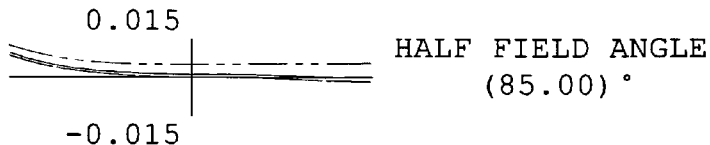
Figure 6E:
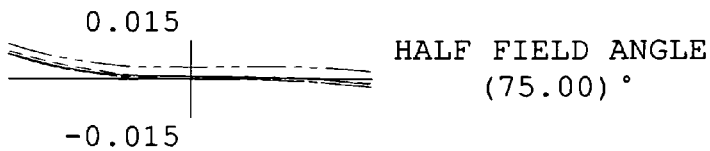
Figure 6F:
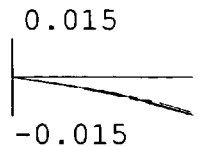
Figure 6G:
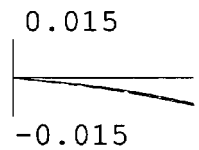
Figure 6H:
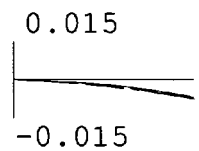
Figure 6I:
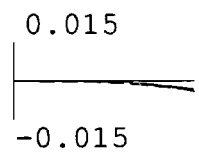
Figure 6J:
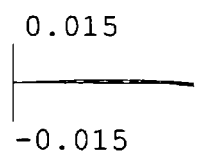
Figure 7A:
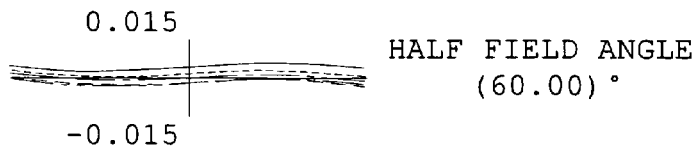
FIGS. 7A to 7E and FIGS. 7F to 7J are aberration curve diagrams of the optical system according to the embodiment 1 in the case where light rays traveling from the front-object side to the imaging plane are traced in a close observation of an object on the front side.
Figure 7B:
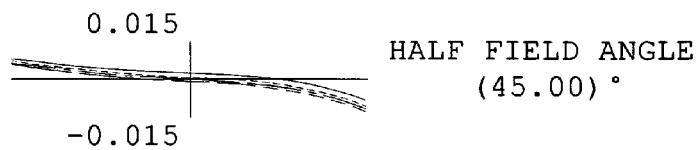
Figure 7C:
Figure 7D:
Figure 7E:
Figure 7F:
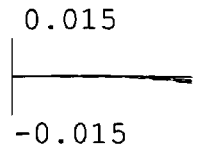
Figure 7G:
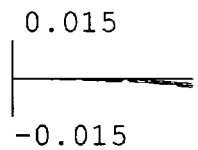
Figure 7H:
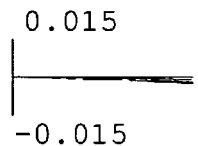
Figure 7I:
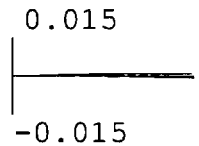
Figure 7J:
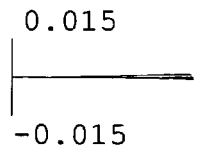
Figure 8A:
FIGS. 8A to 8E and FIGS. 8F and 8J are aberration curve diagrams of the optical system according to the embodiment 1 in the case where light rays traveling from the approximately-lateral-object side to the imaging plane are traced in a close observation of an object on the front side.
Figure 8B:
Figure 8C:
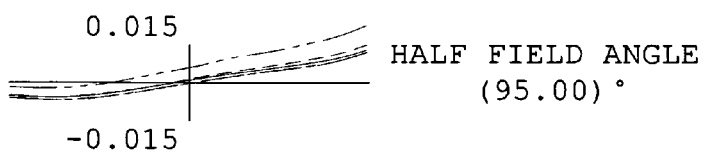
Figure 8D:
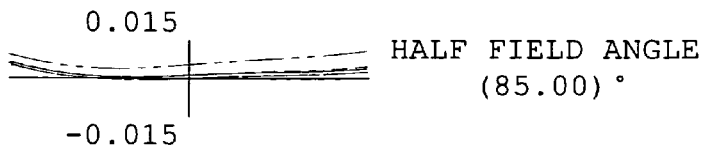
Figure 8E:
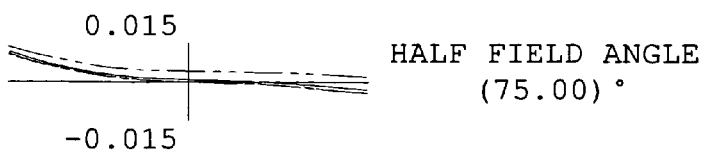
Figure 8F:
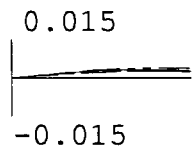
Figure 8G:
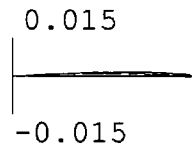
Figure 8H:
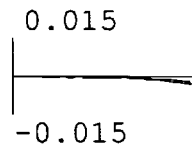
Figure 8I:
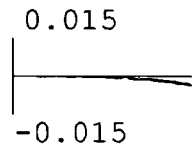
Figure 8J:
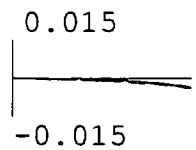

Now, the lens $L_{21}$, which is a reflective refractive optical element for simultaneously observing front and approximately lateral objects, is explained in detail using FIG. 4. The lens $L_{21}$ which is a reflective refractive optical element includes: a first surface $L_{21}a$ which is formed on the front-object side; a second surface $L_{21}b$ which is formed on the image side; and a third surface $L_{21}c$ which is formed all over the peripheral surface of the lens $L_{21}$ between the first and second surfaces $L_{21}a$ and $L_{21}b$.

The first surface $L_{21}a$ includes: a first transmitting surface $L_{21}a_1$ which is formed with the center of the first transmitting surface on the optical axis; and a first reflective surface $L_{21}a_2$ which faces toward the image side and is formed around the first transmitting surface $L_{21}a_1$ and in the shape of a ring. The second surface $L_{21}b$ includes: a second transmitting surface $L_{21}b_1$ which is formed with the center of the second transmitting surface on the optical axis; and a second reflective surface $L_{21}b_2$ which faces toward the front-object side and is formed around the second transmitting surface $L_{21}b_1$ and in the shape of a ring. The whole of the third surface $L_{21}c$ is formed as a transmitting surface.

Besides, the first and second reflective surfaces $L_{21}a_2$ and $L_{21}b_2$ are formed by a deposition method. Concretely, for example, after a mask the shaped of which is the same as the shape of the first transmitting surface $L_{21}a_1$ is put on the first transmitting surface $L_{21}a_1$, a mirror coating is given to the whole of the first surface $L_{21}a$, and then, the mask is removed from the first surface $L_{21}a$. The masked portions of the first surface are not given the mirror coating by the use of such method. Accordingly, the first transmitting surface $L_{21}a_1$ can be used as a transmitting surface even after forming the first reflective surface $L_{21}a_2$.

Next, paths which light rays incident on the optical system of the present embodiment traces are explained using FIGS. 2, 3, and 4.

Light rays $L_f$ incident on the optical system of the present embodiment from the front-object side pass through the lens $L_1$ first, the light rays $L_f$ having passed through the lens $L_1$ are incident on the first transmitting surface $L_{21}a_1$ of the lens $L_{21}$, and then, the light rays $L_f$ incident on the first transmitting surface $L_{21}a_1$ emerge from the second transmitting surface $L_{21}b_1$ of the lens $L_{21}$. The light rays $L_f$ having emerged from the second transmitting surface $L_{21}b_1$ pass through the lens $L_{22}$, the lens $L_{23}$, the aperture stop S, and the lens $L_{31}$—the lens $L_{35}$ in that order. And then, the light rays $L_f$ form the image of the front object in the central portion of the observation area, on the imaging plane.

On the other hand, light rays $L_s$ incident on the optical system of the present embodiment from the approximately-lateral-object side are incident on the third surface $L_{21}c$ of the lens $L_{21}$ first, and the light rays $L_s$ incident on the third surface $L_{21}c$ are reflected by the second reflective surface $L_{21}b_2$ of the lens $L_{21}$. Next, the light rays $L_s$ reflected by the second reflective surface $L_{21}b_2$ are reflected by the first reflective surface $L_{21}a_2$ of the lens $L_{21}$. And then the light rays $L_s$ reflected by the first reflective surface $L_{21}a_2$ emerge from the second transmitting surface $L_{21}b_1$ of the lens $L_{21}$. The light rays $L_s$ having emerged from the second transmitting surface $L_{21}b_1$ passes through the lens $L_{22}$, the lens $L_{23}$, the aperture stop S, and the lens $L_{31}$—the lens $L_{35}$ in that order. And then, the light rays $L_s$ form the image of the approximately lateral object in the shape of a ring and around the image of the front object formed in the central portion of the observation area, on the imaging plane.

Next, the numerical data of lenses which constitute the optical system according to the present embodiment are shown.

| Numerical value data 1 Unit: millimeter (mm) Surface data | | | | |
|---|---|---|---|---|
| Surface number s | Radius of curvature r | Surface interval d | Refractive index nd | Abbe's number vd |
| 0 (Object surface) | | D0 | | |
| 1 | ∞ | 0.7 | 1.5163 | 64.1 |

-continued

Numerical value data 1
Unit: millimeter (mm)
Surface data

| Surface number s | Radius of curvature r | Surface interval d | Refractive index nd | Abbe's number vd |
|---|---|---|---|---|
| 2 | 1.843 | 1 | | |
| 3 (Aspherical surface) | 14.680 | 0.85 | 1.5163 | 64.1 |
| 4 | 2 | 1.773 | | |
| 5 | 3 | 3 | | |
| 6 | −1.675 | 0.6 | 1.5163 | 64.1 |
| 7 | −3.105 | 0 | | |
| 8 (Aperture stop) | ∞ | 1.198 | | |
| 9 (Aspherical surface) | −11.089 | 1.55 | 1.7550 | 52.3 |
| 10 | −2.471 | D10 | | |
| 11 | 2.952 | 1.65 | 1.7292 | 54.7 |
| 12 | −3.404 | 0.4 | 1.8467 | 23.8 |
| 13 | 3.701 | 0.250 | | |
| 14 | 12.627 | 1 | 1.5163 | 64.1 |
| 15 (Aspherical surface) | −3.101 | D15 | | |
| 16 | ∞ | 2 | 1.5163 | 64.1 |
| 17 | ∞ | 0 | | |
| 18 (Imaging plane) | | | | |

Besides, the radius of curvature corresponding to the surface number 5 is a radius of curvature of the third surface $L_{21}c$ of the lens $L_{21}$ which is a reflective refractive optical element, or a radius of curvature of a cylinder-shaped surface the center of which is on the optical axis. Also, the surface interval corresponding to the surface number 5 is a distance from the optical axis to the surface having the surface number 5.

Aspherical surface data

| Surface number s | Radius of curvature r | Conical coefficient k |
|---|---|---|
| 3 | 14.67997 | 0 |
| 9 | −11.0886 | 0 |
| 15 | −3.10081 | 0 |

| Surface number s | Aspherical surface coefficients | | | |
|---|---|---|---|---|
| | $A_4$ | $A_6$ | $A_8$ | $A_{10}$ |
| 3 | 1.71E−02 | −1.89E−03 | 7.17E−05 | 7.35E−06 |
| 9 | −2.23E−02 | 4.45E−02 | −3.91E−02 | 1.22E−02 |
| 15 | 3.48E−03 | 1.52E−02 | 9.57E−03 | −4.26E−03 |

Various data

F-number: 5.0
The total length of lens: 13.7 mm
Back focus: 0 mm
Image height: 1.3 mm Surface interval

| | Far observation | Close observation |
|---|---|---|
| D0 | 11.423 | 0.634 |
| D10 | 0.279 | 0.1 |
| D15 | 0.452 | 0.631 |

Moving distance of moving lens group $G_m$: 0.351 mm
Half Angle of View
  Half angle of view to the front-object side
    In both far and close observations: 61°
  Half angle of view to the approximately-lateral-object side (the minimum to maximum angles of view)
    In both far and close observations: 71°-118°

Focal Length
  The focal length of the whole system on the front-object side
    In far observation: 0.767 mm
    In close observation: 0.758 mm
  The focal length of first lens group $G_1$
    In both far and close observations: −3.555 mm
  The focal length of second lens group $G_2$ on the front-object side
    In both far and close observations: −2.691 mm
  The combined focal length of first lens group $G_1$ and second lens group $G_2$
    In both far and close observations: −1.155 mm
  The focal length of third lens group $G_3$
    In far observation ($f_{r\_w}$): 2.439 mm
    In close observation ($f_{r\_c}$): 2.387 mm
  The focal length ($f_m$) of moving lens group $G_m$
    In both far and close observations: 5.206 mm
Data regarding the above condition $$f_{r\_c}/f_{r\_w}=0.979$$

$$f_m/(f_{r\_c}+f_{r\_w})/2=2.157$$

Embodiment 2

Next, the optical system according to the embodiment 2 is explained in detail using FIGS. 9 to 14. Besides, since the shape of a reflective refractive optical element and paths of light incident on the optical system in the optical system of the present embodiment are approximately the same as those in the optical system of the embodiment 1, respectively, a component for the present embodiment having approximately the same formation as that for the embodiment 1 is given the same numeral number, and the explanation of the component is omitted.

Figure 9A:
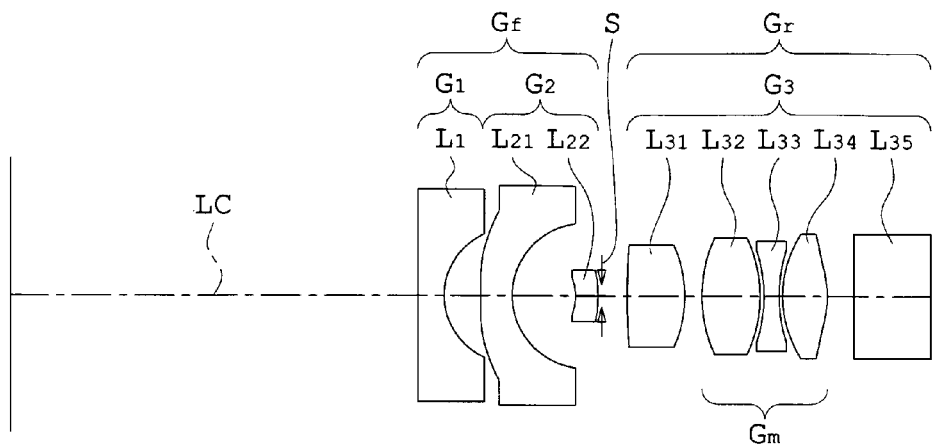
FIGS. 9A and 9B are sectional views showing the formation of an optical system according to the embodiment 2, taken along the optical axis, in the cases of far observations of objects on the front and approximately-lateral sides and a close observation of an object on the front side, respectively.
Figure 9B:
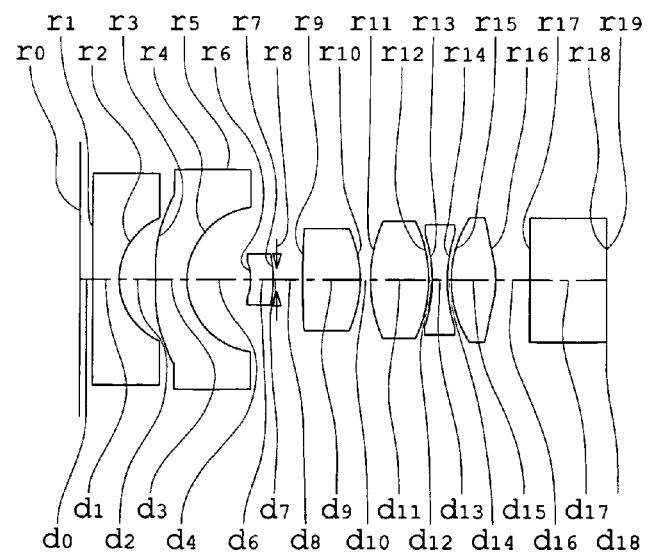
Figure 10A:
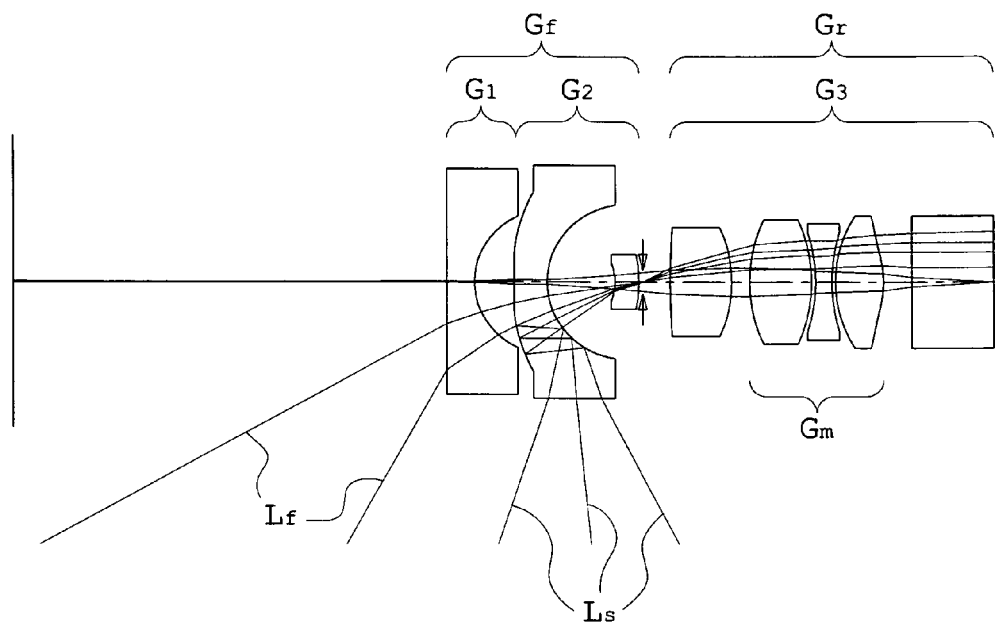
FIGS. 10A and 10B are sectional views showing the formation of an optical system according to the embodiment 2 and optical paths, taken along the optical axis, in the cases of far observations of objects on the front and approximately-lateral sides and a close observation of an object on the front side, respectively.
Figure 10B:
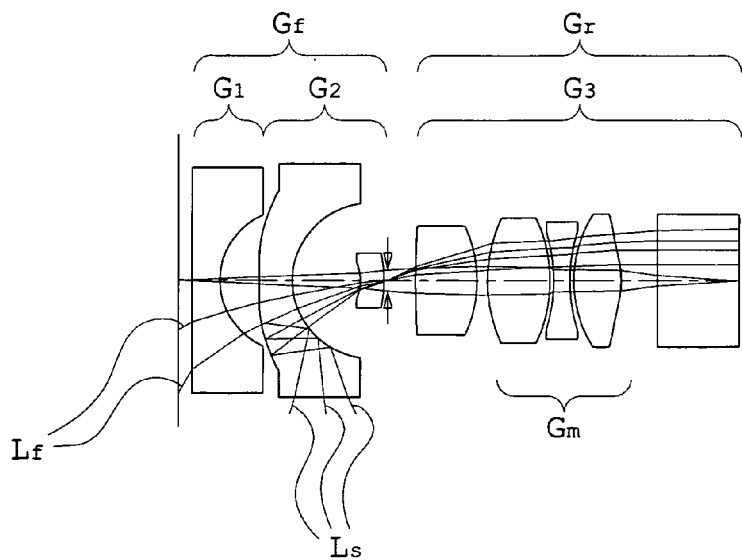
Figure 11A:
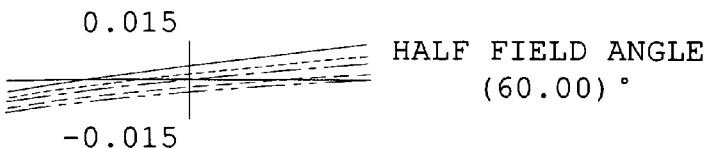
FIGS. 11A to 11E and FIGS. 11F to 11J are aberration curve diagrams of the optical system according to the embodiment 2 in the case where light rays traveling from the front-object side to the imaging plane are traced in far observations of objects on the front and approximately-lateral sides.
Figure 11B:
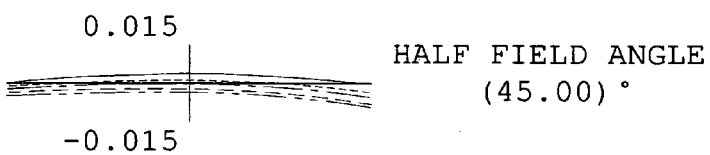
Figure 11C:
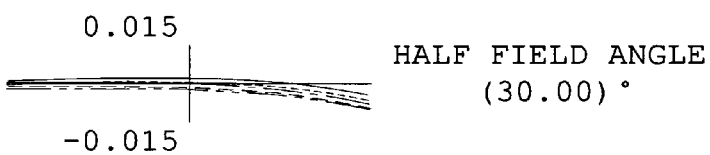
Figure 11D:
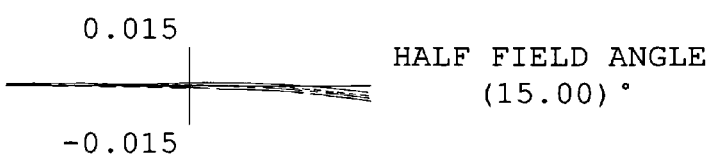
Figure 11E:
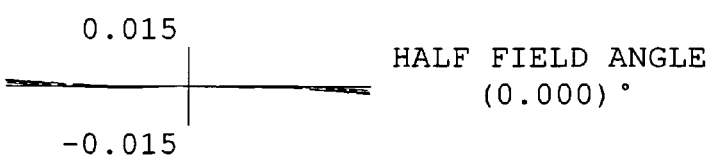
Figure 11F:
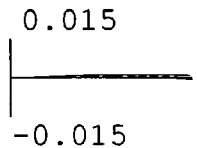
Figure 11G:
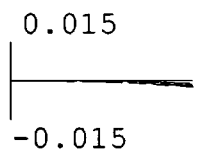
Figure 11H:
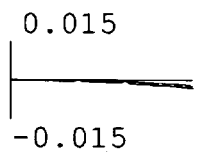
Figure 11I:
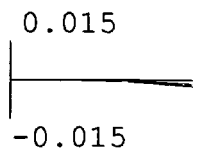
Figure 11J:
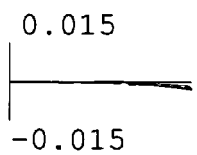
Figure 12A:
FIGS. 12A to 12E and FIGS. 12F to 12J are aberration curve diagrams of the optical system according to the embodiment 2 in the case where light rays traveling from the approximately-lateral-object side to the imaging plane are traced in far observations of objects on the front and approximately-lateral sides.
Figure 12B:
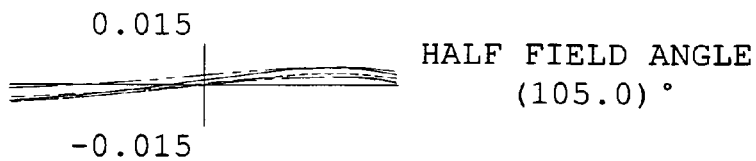
Figure 12C:
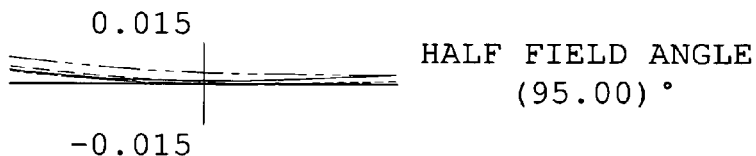
Figure 12D:
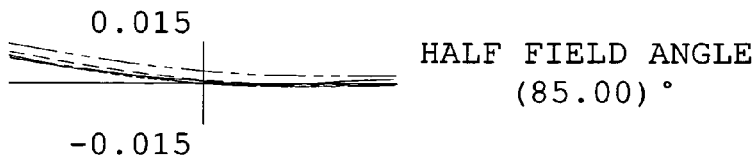
Figure 12E:
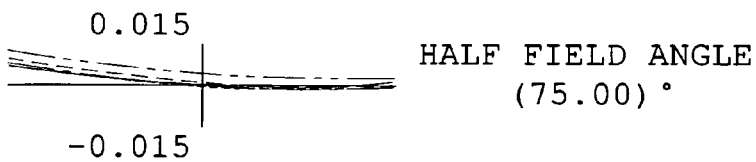
Figure 12F:
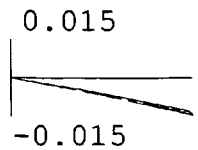
Figure 12G:
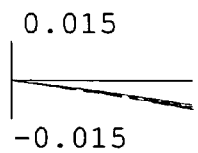
Figure 12H:
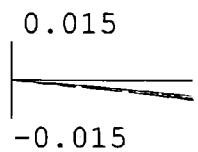
Figure 12I:
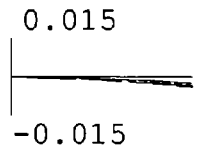
Figure 12J:
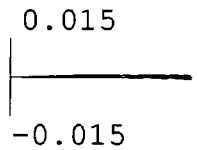
Figure 13A:
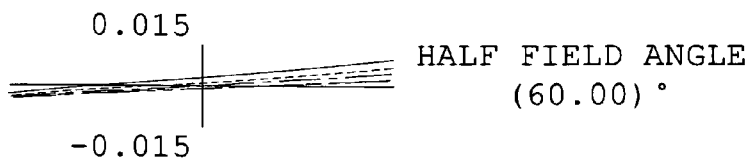
FIGS. 13A to 13E and FIGS. 13F to 13J are aberration curve diagrams of the optical system according to the embodiment 2 in the case where light rays traveling from the front-object side to the imaging plane are traced in a close observation of an object on the front side.
Figure 13B:
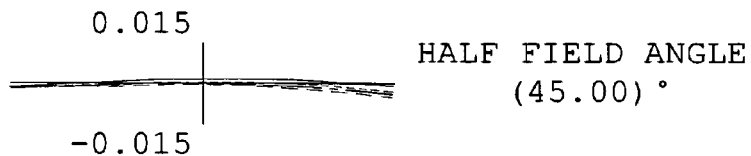
Figure 13C:
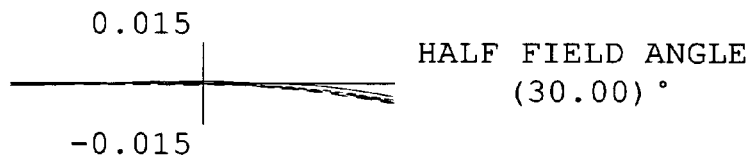
Figure 13D:
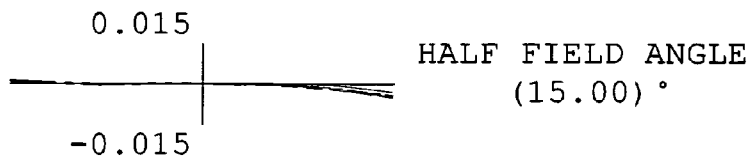
Figure 13E:
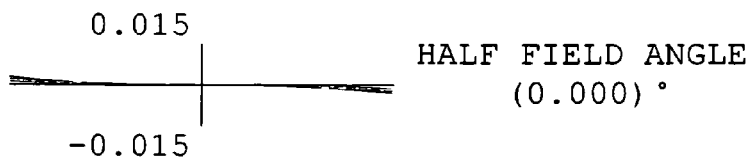
Figure 13F:
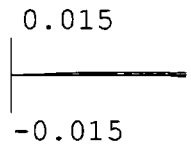
Figure 13G:
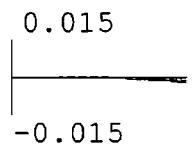
Figure 13H:
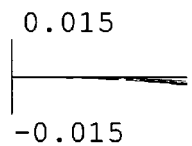
Figure 13I:
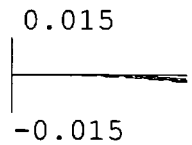
Figure 13J:
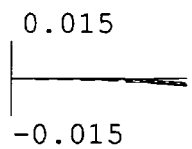
Figure 14A:
FIGS. 14A to 14E and FIGS. 14F and 14J are aberration curve diagrams of the optical system according to the embodiment 2 in the case where light rays traveling from the approximately-lateral-object side to the imaging plane are traced in a close observation of an object on the front side.
Figure 14B:
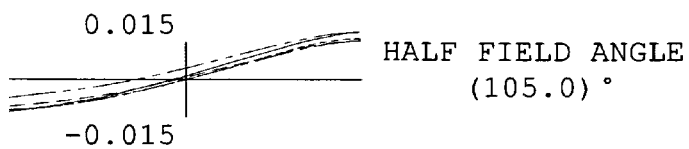
Figure 14C:
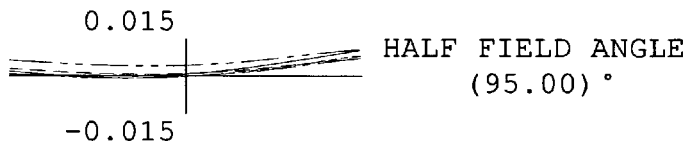
Figure 14D:
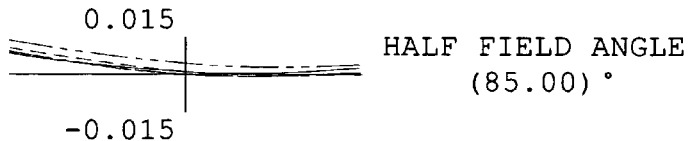
Figure 14E:
Figure 14F:
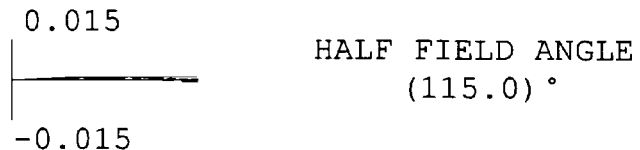
Figure 14G:
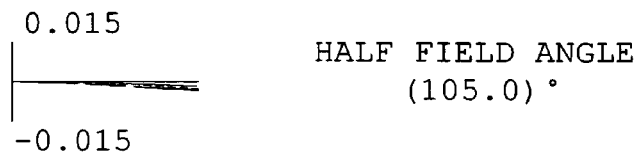
Figure 14H:
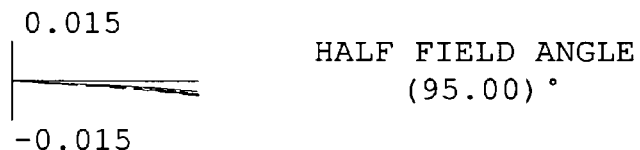
Figure 14I:
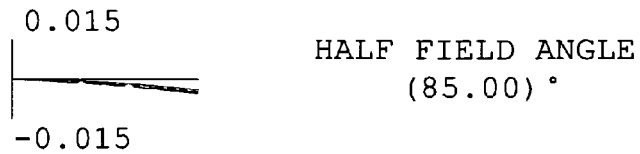
Figure 14J:
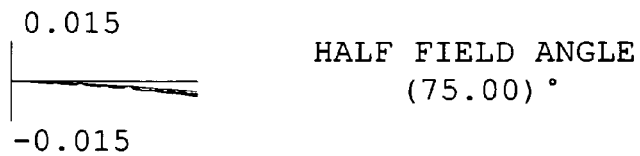

First, the formation of the optical system of the present embodiment is explained using FIGS. 9 and 10.

In the optical system of the present embodiment, a front group $G_f$ having negative refractive power as a whole, an aperture stop S, a rear group $G_r$ having positive refractive power as a whole are arranged on the optical axis LC of light from the front-object side and in order from the front-object side. The front group $G_f$ includes a first lens group $G_1$ and a second lens group $G_2$. The rear group $G_r$ includes a third lens group $G_3$.

The first lens group $G_1$ is composed of a lens $L_1$ which is a plano-concave lens the concave surface of which faces toward the image side.

The second lens group $G_2$ is composed of a lens $L_{21}$ and a lens $L_{22}$ in order from the front-object side, where the lens $L_{21}$ is a reflective refractive optical element the front-object-side surface of which is an aspherical surface, and the lens $L_{22}$ is a negative meniscus lens the convex surface of which faces toward the image side.

The aperture stop S is arranged on the image-side surface of the lens $L_{22}$.

The third lens group $G_3$ is composed of a lens $L_{31}$, a lens $L_{32}$, a lens $L_{33}$, a lens $L_{34}$, and a lens $L_{35}$ in order from the front-object side, where the lens $L_{31}$ is a biconvex lens, the lens $L_{32}$ is a biconvex lens, the lens $L_{33}$ is a biconcave lens, the lens $L_{34}$ is a biconvex lens the image-side surface of which is an aspherical surface, the lens $L_{35}$ is a planer lens. Besides, the lens $L_{32}$, the lens $L_{33}$, and the lens $L_{34}$ form a moving lens group $G_m$ and can integratedly move on the optical axis.

Besides, the shapes of these lenses correspond to a shape in the vicinity of the optical axis of light from the front-object side.

Next, the numerical data of lenses which constitute the optical system according to the present embodiment are shown.

Numerical value data 2
Unit: millimeter (mm)
Surface data

| Surface number s | Radius of curvature r | Surface interval d | Refractive index nd | Abbe's number vd |
|---|---|---|---|---|
| 0 (Object surface) | | D0 | | |
| 1 | ∞ | 0.7 | 1.5163 | 64.1 |
| 2 | 1.848 | 1 | | |
| 3 (Aspherical surface) | 15.320 | 0.85 | 1.5163 | 64.1 |
| 4 | 2 | 1.714 | | |
| 5 | 3 | 3 | | |
| 6 | −1.379 | 0.6 | 1.5163 | 64.1 |
| 7 | −3.289 | 0 | | |
| 8 (Aperture stop) | ∞ | 0.689 | | |
| 9 | 22.380 | 1.55 | 1.7550 | 52.3 |
| 10 | −3.407 | D10 | | |
| 11 | 3.950 | 1.55 | 1.7292 | 54.7 |
| 12 | −3.792 | 0.1 | | |
| 13 | −4.100 | 0.4 | 1.8467 | 23.8 |
| 14 | 4.205 | 0.1 | | |
| 15 | 3.176 | 1.2 | 1.5163 | 64.1 |
| 16 (Aspherical surface) | −2.775 | D16 | | |
| 17 | ∞ | 2.05 | 1.5163 | 64.1 |
| 18 | ∞ | 0 | | |
| 19 (Imaging plane) | | | | |

Besides, the radius of curvature corresponding to the surface number 5 is a radius of curvature of the third surface $L_{21}c$ of the lens $L_{21}$ which is a reflective refractive optical element, or a radius of curvature of a cylinder-shaped surface the center of which is on the optical axis. Also, the surface interval corresponding to the surface number 5 is a distance from the optical axis to the surface having the surface number 5.

Aspherical surface data

| Surface number s | Radius of curvature r | Conical coefficient k |
|---|---|---|
| 3 | 15.32004 | 0 |
| 16 | −2.77454 | 0 |

| Surface number s | Aspherical surface coefficients | | | |
|---|---|---|---|---|
| | $A_4$ | $A_6$ | $A_8$ | $A_{10}$ |
| 3 | 1.79E−02 | −2.01E−03 | 9.23E−05 | 6.00E−06 |
| 16 | 3.49E−02 | −3.43E−03 | 9.95E−03 | −2.83E−03 |

Various data

F-number: 5.3
The total length of lens: 13.771 mm
Back focus: 0 mm
Image height: 1.3 mm Surface interval

| | Far observation | Close observation |
|---|---|---|
| D0 | 10.935 | 0.343 |
| D10 | 0.450 | 0.264 |
| D16 | 0.718 | 0.904 |

Moving distance of moving lens group $G_m$: 0.186 mm
Half Angle of View
  Half angle of view to the front-object side
    In both far and close observations: 61°
  Half angle of view to the approximately-lateral-object side (the minimum to maximum angles of view)
    In both far and close observations: 71°–118°
Focal Length
  The focal length of the whole system on the front-object side
    In far observation: 0.755 mm
    In close observation: 0.751 mm
  The focal length of first lens group $G_1$
    In both far and close observations: −3.566 mm
  The focal length of second lens group $G_2$ on the front-object side
    In both far and close observations: −2.118 mm
  The combined focal length of first lens group $G_1$ and second lens group $G_2$
    In both far and close observations: −0.958 mm
  The focal length of third lens group $G_3$
    In far observation ($f_{r\_w}$): 2.539 mm
    In close observation ($f_{r\_c}$): 2.462 mm
  The focal length ($f_m$) of moving lens group $G_m$
    In both far and close observations: 3.725 mm
Data regarding the above condition $$f_{r\_c}/f_{r\_w}=0.970$$

$$f_m/(f_{r\_c}+f_{r\_w})/2=1.490$$

Also, the optical system of each of the above embodiments may be provided with another moving lens group besides the above-described moving lens group so that a magnification of the image of a front object is changed by the movement of the another moving lens group. Also, when the optical system is focused on an approximately lateral object, a magnification of the image of the approximately lateral object may be changed by the use of the another moving lens group.

Also, lenses which compose a lens group for an optical system of the present invention are not limited to the shapes and the number of lenses which are described in the above embodiments, and optical systems according to the present invention include various kinds of optical systems including a reflective refractive optical element.

Also, an image pick-up element, which is not arranged in the optical systems of the above embodiments, may be arranged on the image side of an optical system of the present invention, and, in addition, a low-pass filter or a CCD cover grass which are given an IR-cut coating may be arranged between the optical system and the image pick-up element.

Also, the optical system of each of the above embodiments consists of three lens groups. However, an optical system according to the present invention is not limited to these embodiments, and an optical system according to the present invention may consist of two lens groups or four or more lens groups.

Also, in each of the above embodiments, the third surface of the reflective refractive optical element has a shape in which the front-object-side diameter of the third surface is approximately the same as the image-side diameter of the third surface. However, an optical system according to the present invention may use a reflective refractive optical element the third surface of which has a shape in which the image-side diameter of the third surface is larger than the front-object-side diameter of the third surface, or a shape in which the image-side diameter of the third surface is smaller than the front-object-side diameter of the third surface. Besides, the term, "the front-object-side diameter", means a diameter included in the plane which is perpendicular to the optical axis and located at the position nearest to the front-object side in the third surface. The term, "the image-side diameter", means a diameter included in the plane which is perpendicular to the optical axis and located at the position nearest to the image side in the third surface. In addition, in each of the above embodiments, the third surface of the reflective refractive optical element is formed between the first and second surfaces and all over the peripheral surface of the reflective refractive optical element. However, the third surface need not to be necessarily formed all over the peripheral surface of the reflective refractive optical element, and only a part of the peripheral surface of the reflective refractive optical element may be formed as a transmitting surface.

Also, in each of the above embodiments, the reflective refractive optical element is composed of a single lens. However, a reflective refractive optical element for an optical system according to the present invention may be composed of a cemented lens.

In addition, in each of the above embodiments, the first and second reflective surfaces are formed by a deposition method. However, a method for forming the first and second reflective surfaces in the present invention is not limited to such method.

What is claimed is:

1. An optical system for observing a front object and an approximately lateral object, comprising, in order from a front-object side:
    a front group having a reflective refractive optical element, a refractive power of the front group being negative;
    an aperture stop; and
    a rear group having a moving lens unit, a refractive power of the rear group being positive, wherein the moving lens unit is configured to be movable in a direction along an optical axis,
    wherein the reflective refractive optical element includes:
        a first face which has a first transmitting surface and a first reflective surface and is formed on the front-object side, where the first transmitting surface is formed with the optical axis being at a center thereof and the first reflective surface is formed in a shape of a ring around the first transmitting surface and faces toward the image side,
        a second face which has a second transmitting surface and a second reflective surface and is formed on an image side, where the second transmitting surface is formed with the optical axis being at a center thereof and the second reflective surface is formed in a shape of a ring around the second transmitting surface and faces toward the front-object side, and
        a third face which is formed as a transmitting surface between the first face and the second face, and
    wherein the optical system makes focus on an object while hardly changing, in an entire observation area, an area in which an image of the front object is formed, by moving the moving lens unit to the extent that the refractive power of the front group and the refractive power of the rear group hardly change relative to each other.

2. The optical system according to claim 1, wherein the moving lens unit has positive refractive power.

3. The optical system according to claim 1, wherein the rear group has, at a position nearest to the object side, another lens unit that differs from the moving lens unit.

4. The optical system according to claim 1, wherein
    the front group is divided into a first lens group having negative refractive power and a second lens group,
    the rear group is formed of a third lens group having positive refractive power, and
    a first optical system for observing a front object is formed of the first lens group in the front group, the second lens group in the front group, the aperture stop, and the third lens group in the rear group, and a second optical system for observing an approximately lateral object is formed of the second lens group in the front group, the aperture stop, and the third lens group in the rear group.

5. The optical system according to claim 1, wherein the following condition is satisfied:

$$1.4 < f_m/((f_{r\_c} + f_{r\_w})/2) < 2.3$$

where $f_m$ is a focal length of the moving lens unit, $f_{r\_w}$ is a focal length of the rear group in a condition for far observation of front and approximately lateral objects, and $fr\_c$ is a focal length of the rear group in a condition for close observation of front and approximately lateral objects.

6. The optical system according to claim 1, wherein the reflective refractive optical element is constructed and arranged so that:
    the first transmitting surface receives and transmits light from the front-object side;
    the second transmitting surface transmits, toward the image side, the light having been transmitted through the first transmitting surface;
    the third face receives and transmits light from the approximately-lateral-object side;
    the second reflective surface reflects the light having been transmitted through the third face;
    the first reflective surface reflects the light having been reflected from the second reflective surface; and
    the second transmitting surface transmits, toward the image side, also the light having been reflected from the first reflective surface.

* * * * *